(12) United States Patent
Ohashi

(10) Patent No.: US 9,134,507 B2
(45) Date of Patent: Sep. 15, 2015

(54) IMAGING LENS, CAMERA, AND PORTABLE INFORMATION TERMINAL DEVICE

(71) Applicant: Kazuyasu Ohashi, Funabashi (JP)

(72) Inventor: Kazuyasu Ohashi, Funabashi (JP)

(73) Assignee: RICOH COMPANY, LTD., Tokyo (JP)

( * ) Notice: Subject to any disclaimer, the term of this patent is extended or adjusted under 35 U.S.C. 154(b) by 202 days.

(21) Appl. No.: 13/906,594

(22) Filed: May 31, 2013

(65) Prior Publication Data
US 2013/0321936 A1 Dec. 5, 2013

(30) Foreign Application Priority Data
Jun. 4, 2012 (JP) .................... 2012-127431

(51) Int. Cl.
*G02B 9/34* (2006.01)
*G02B 13/00* (2006.01)
*G02B 9/60* (2006.01)
*G02B 13/04* (2006.01)

(52) U.S. Cl.
CPC ............... *G02B 13/001* (2013.01); *G02B 9/34* (2013.01); *G02B 9/60* (2013.01); *G02B 13/0015* (2013.01); *G02B 13/04* (2013.01)

(58) Field of Classification Search
CPC .......... G02B 9/34; G02B 9/58; G02B 13/001; G02B 13/004
USPC ................. 359/740, 782–783, 781, 770, 753, 359/714–715
See application file for complete search history.

(56) References Cited

U.S. PATENT DOCUMENTS

| | | |
|---|---|---|
| 5,153,779 A | 10/1992 | Ohashi |
| 5,398,135 A | 3/1995 | Ohashi |
| 5,576,891 A | 11/1996 | Ohashi |
| 5,617,254 A | 4/1997 | Ohashi |
| 5,687,401 A | 11/1997 | Kawamura et al. |
| 5,930,056 A | 7/1999 | Ohashi |
| 6,353,506 B1 | 3/2002 | Ohashi |
| 2002/0024745 A1 | 2/2002 | Ohashi |
| 2002/0060855 A1 | 5/2002 | Ohashi |
| 2002/0101665 A1 | 8/2002 | Ohashi et al. |
| 2003/0210473 A1 | 11/2003 | Ohashi |
| 2004/0004772 A1 | 1/2004 | Ohashi et al. |
| 2004/0008420 A1 | 1/2004 | Ohashi |
| 2004/0136088 A1 | 7/2004 | Ohashi |
| 2005/0036208 A1 | 2/2005 | Ohashi |

(Continued)

FOREIGN PATENT DOCUMENTS

| | | |
|---|---|---|
| JP | 08-313802 | 11/1996 |
| JP | 11-326756 | 11/1999 |

(Continued)

*Primary Examiner* — Zachary Wilkes
(74) *Attorney, Agent, or Firm* — Oblon, McClelland, Maier & Neustadt, L.L.P.

(57) ABSTRACT

An imaging lens, includes: in order from an object side to an image side, a first negative lens group including a negative lens a concave surface of which faces the image side; a second positive lens group including a negative lens a concave surface of which faces the object side, and a positive lens, or a cemented lens entirely having a positive refractive power in order from the object side to the image side; an aperture; a third positive lens group including a cemented lens of a biconvex lens and a biconcave lens from the object side; and a fourth lens group having a weakest refractive power among all of the lens groups and including a single lens, or a cemented lens, a surface on the object side of which is concave and a surface on the image side of which is convex.

14 Claims, 10 Drawing Sheets

(56) References Cited

U.S. PATENT DOCUMENTS

| | | |
|---|---|---|
| 2005/0094002 A1 | 5/2005 | Ohashi |
| 2005/0094285 A1 | 5/2005 | Ohashi |
| 2005/0122596 A1 | 6/2005 | Ohashi |
| 2005/0190457 A1 | 9/2005 | Ohashi |
| 2005/0270663 A1 | 12/2005 | Ohashi |
| 2006/0007561 A1 | 1/2006 | Suzuki |
| 2006/0193062 A1 | 8/2006 | Ohashi |
| 2006/0262422 A1 | 11/2006 | Ohashi |
| 2007/0097517 A1 | 5/2007 | Ohashi |
| 2007/0297068 A1 | 12/2007 | Ohashi |
| 2008/0106799 A1 | 5/2008 | Ohashi |
| 2008/0151385 A1 | 6/2008 | Ohashi |
| 2008/0198477 A1 | 8/2008 | Ohashi |
| 2008/0204894 A1 | 8/2008 | Ohashi |
| 2009/0080088 A1 | 3/2009 | Ohashi |
| 2009/0091841 A1 | 4/2009 | Ohashi |
| 2010/0007967 A1 | 1/2010 | Ohashi |
| 2010/0027136 A1 | 2/2010 | Ohashi et al. |
| 2010/0271710 A1 | 10/2010 | Ohashi |
| 2011/0310496 A1 | 12/2011 | Kubota et al. |
| 2011/0317285 A1 | 12/2011 | Ohashi et al. |
| 2012/0212838 A1 | 8/2012 | Ohashi |

FOREIGN PATENT DOCUMENTS

| | | |
|---|---|---|
| JP | 2005-352060 | 12/2005 |
| JP | 2012-008347 | 1/2012 |

IMAGING LENS, CAMERA, AND PORTABLE INFORMATION TERMINAL DEVICE

CROSS-REFERENCE TO RELATED APPLICATIONS

The present application is based on and claims priority from Japanese Patent Application Number 2012-127431, filed Jun. 4, 2012, the disclosure of which is hereby incorporated by reference herein in its entirety.

BACKGROUND

The present invention relates to an imaging lens, a camera, and a portable information terminal device.

An imaging lens of the present invention is provided as a photographing optical system of a silver-halide camera, a digital camera, a digital video camera, and a portable information terminal device. A camera of the present invention is provided as a silver-halide camera, a digital camera, a digital video camera, and a portable information terminal device.

The use of digital cameras has become commonplace, and there have been various requests from users regarding digital camera functions. Among them, a high-quality compact camera with a relatively large image sensor having a diagonal length of approximately 20-45 mm and a high-performance single focus lens has gained great attention.

As to such a compact camera, in addition to having high performance and a large diameter, excellent portability, that is, miniaturization is in great demand.

In terms of high quality, in addition to having resolution corresponding to an image sensor of at least 12-24 megapixels, less comatic flare, high contrast, and no point image distortion in a peripheral part of an angle of view at an open aperture, less chromatic aberration and no occurrence of unnecessary coloring in a part having a large brightness difference, less distortion, and capability of drawing a straight line as a straight line, and so on are at least needed.

In terms of the large diameter, due to the necessity to make different from a general compact camera with a zoom lens, an F-number of less than F3 at least is needed.

In terms of miniaturization, in a high-resolution compact camera, since a large image sensor is used relative to the size of the camera body, an actual focus length is longer than that of a compact camera having a small image sensor. Therefore, in order to achieve miniaturization of the design while having the high-resolution image sensor, it is necessary to shorten the entire length of the imaging lens in the camera.

Additionally, in terms of an angle of view of a photographing lens, many users demand a rather wide angle, and it is preferable that a half angle of view of an imaging lens be equal to or more than 35 degrees. The half angle of view of 35 degrees is equivalent to a focal length of about 31 mm in a 35-mm silver-halide camera using traditional 35-mm silver-halide film (so-called Leica format silver-halide film).

An image sensor of a digital camera has a color filter and a microlens per pixel, and therefore, it is preferable that a position of an exit pupil be distant from an image plane, and a peripheral light beam be approximately vertically incident onto an imaging plane.

In order to achieve this object, retrofocus-type imaging lenses are suitable, and conventionally many of those have been employed. However, when a retrofocus lens is employed, an entire length of an imaging lens (a length from a surface on a most object side to an image plane) tends to be longer.

Recently, in a relatively large image sensor having a diagonal length of 20-45 mm, due to improvement and optimization of an on-chip microlens, development of image processing, and the like, a slightly inclined incident state has been allowable as a state where a peripheral light beam is incident onto an imaging plane.

That is, in particular, a system capable of sufficiently accepting an angle between a principal ray and an optical axis at a maximum image height of about 35-45 degrees is constructible, and it is possible to choose types of lenses more suitable for miniaturization without restricting a condition of vertical incidence of a peripheral light beam.

From the above viewpoint, as types of lenses more suitable for miniaturization than the retrofocus-type, there are an approximately-symmetric-type, and a telephoto-type in which a lens group having a negative refractive power is arranged on an image side. Conventional examples of imaging lenses of this kind are disclosed in the following patent documents.

Japanese Patent Application Publication Number H08-313802 discloses an imaging lens of an approximately-symmetric-type wide lens having a sufficiently large diameter. However, an entire length of the lens, or an entire thickness of the lens (length from a surface on a most object side to a surface on a most image side of a lens system) is large, and therefore, there is room for improvement in terms of miniaturization.

Japanese Patent Application Publication Number H11-326756 discloses an imaging lens having a constitution close to an approximately-symmetric-type, and achieves a wide angle that exceeds a half angle of view of 50 degrees; however, its smallest F-number is F4-4.5, which is large.

Japanese Patent Application Publication Number 2005-352060 discloses an imaging lens having a small entire length/thickness of the lens; however, since a back focal distance is short, a diameter of a lens close to an image plane is large. Therefore, there is room for improvement in terms of miniaturization.

Japanese Patent Application Publication Number 2012-008347 discloses an imaging lens that excels in an angle of view, an F-number, and imaging performance; however, a feature of a retrofocus lens strongly remains, and therefore, there is room for improvement in terms of miniaturization.

SUMMARY

An object of the present invention is to provide an imaging lens that is wide-angle where a half angle of view is approximately 35-43 degrees, and has a large diameter where a smallest F-number is approximately F2.8, but is small in all of an entire length, an entire thickness, a diameter of the lens and achieves high resolution and high performance, and a camera and a portable information terminal device using the above imaging lens.

In order to achieve the above object, an embodiment of the present invention provides an imaging lens, comprising: in order from an object side to an image side, a first lens group having a negative refractive power; a second lens group having a positive refractive power; an aperture; a third lens group having a positive refractive power; and a fourth lens group, wherein a refractive power of the fourth lens group is weakest among all of the lens groups, the first lens group includes a negative lens a concave surface of which faces the image side, the second lens group includes in order from the object side to the image side a negative lens a concave surface of which faces the object side, and a positive lens, or a cemented lens entirely having a positive refractive power, the third lens group includes a cemented lens of a biconvex lens and a biconcave lens from the object side, and the fourth lens group is a single lens, or a cemented lens a surface on the object side of which is a concave surface and a surface on the image side of which is a convex surface.

Figure 17:
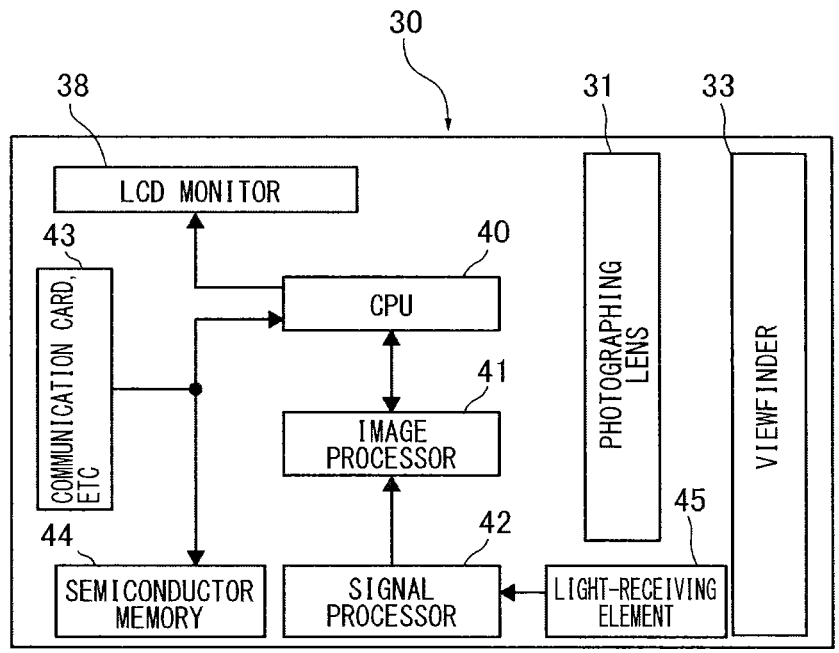
FIG. 17 is a diagram that explains a system configuration of an example of a portable information terminal device.
Figure 18A:
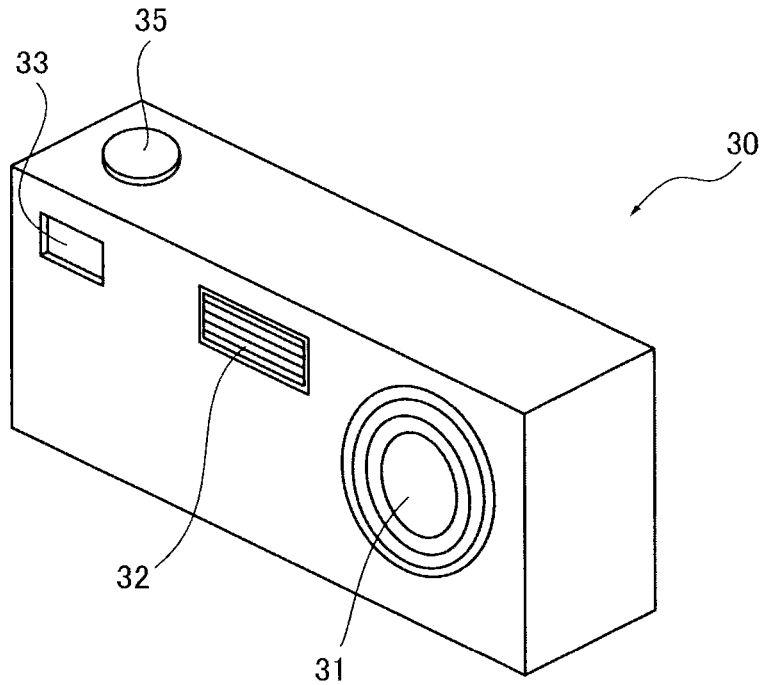
Figure 18B:
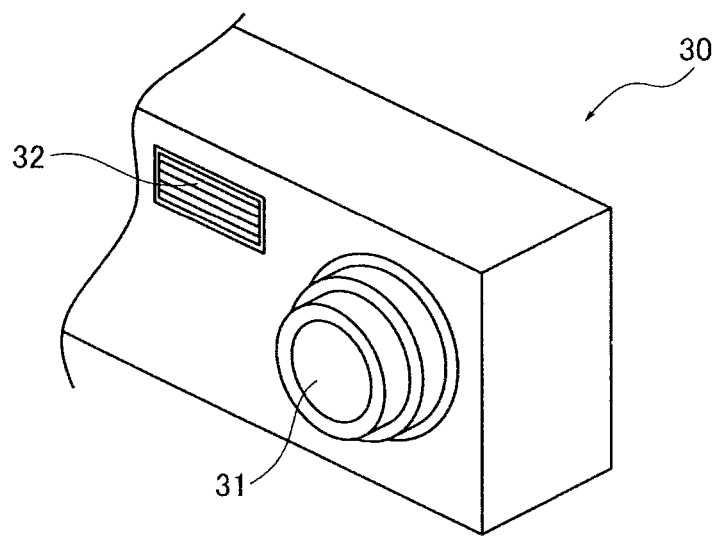
Figure 18C:
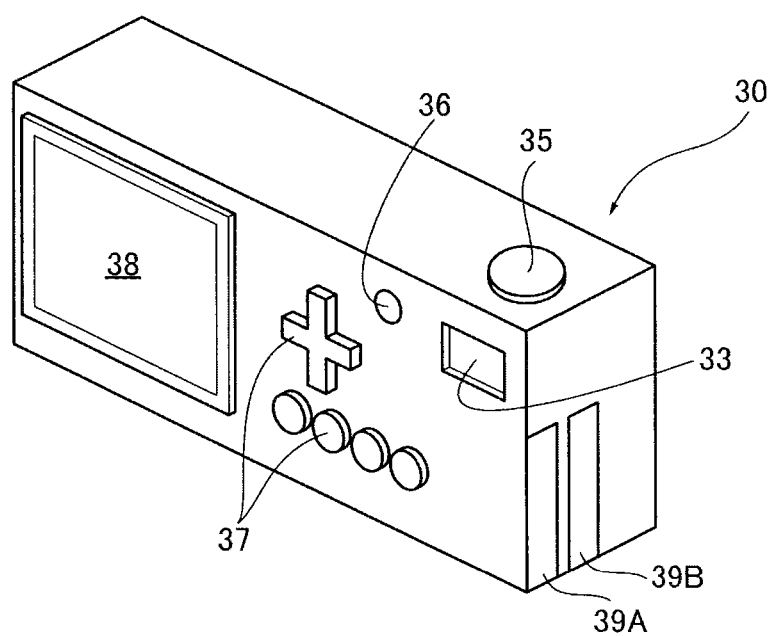

Each of FIGS. 18A, 18B, and 18C illustrates a diagram that explains an external view of the portable information terminal device in FIG. 17.

DETAILED DESCRIPTION OF THE PREFERRED EMBODIMENTS

Hereinafter, examples according to an embodiment of the present invention will be explained.

FIGS. 1 to 8 illustrate eight examples of an imaging lens. Imaging lenses in those examples correspond to later-described Examples 1-8, respectively, in order.

In order to avoid confusion, reference signs are shared in those drawings. In each drawing, the left side is an object side, and the right side is an image side.

Reference sign I on a most image side denotes a first lens group, reference sign II denotes a second lens group, reference sign III denotes a third lens group, and reference sign IV denotes a fourth lens group.

Reference sign S between the second lens group II and the third lens group III denotes an aperture.

Each example shows an imaging lens that makes an image sensor such as a CCD (Charge-Coupled Device) image sensor, a CMOS (Complementary Metal-Oxide semiconductor) image sensor, or the like image an image of an object. In each drawing, reference sign F shown on the right side envisages a filter, for example, an optical low-pass filter, an infrared-cut filter, or the like, or a cover glass (seal glass) of an image sensor, for example, a CMOS image sensor, or the like, and is illustrated as a transparent parallel flat plate that is optically equivalent to that.

In later-described Examples 1-8, the parallel flat plate F is arranged such that a surface on the image side of the parallel flat plate F (surface on the right side of the drawing) is in a position of approximately 0.5 mm on the object side from an imaging plane Im; however, it is not limited thereto. The parallel flat plate F may be a constitution of a plurality of plates.

The imaging plane Im corresponds to a light-receiving surface of the image sensor.

The imaging lens according to the embodiment of the present invention is an approximately-symmetric-type wide angle lens as illustrated in FIGS. 1-8, and achieves miniaturization in all of an entire length, an entire thickness, and a diameter of the lens by an appropriate lens constitution and a power arrangement that have never been realized before.

The imaging lens illustrated in each of FIGS. 1-8 includes, from the object side to the image side in order, the first lens group I having a negative refractive power, the second lens group II having a positive refractive power, the aperture S, the third lens group III having a positive refractive power III, and the fourth lend group IV.

The first lens group I includes a negative lens a concave surface of which faces the image side.

The second lens group II includes, from the object side to the image side in order, a negative lens a concave surface of which faces the object side, and a positive lens, or a cemented lens having entirely a positive refractive power.

In the examples illustrated in FIGS. 1, and 3-7, the second lens group II includes, from the object side to the image side in order, a negative lens a concave surface of which faces the object side, and a cemented lens having entirely a positive refractive power.

Figure 1:
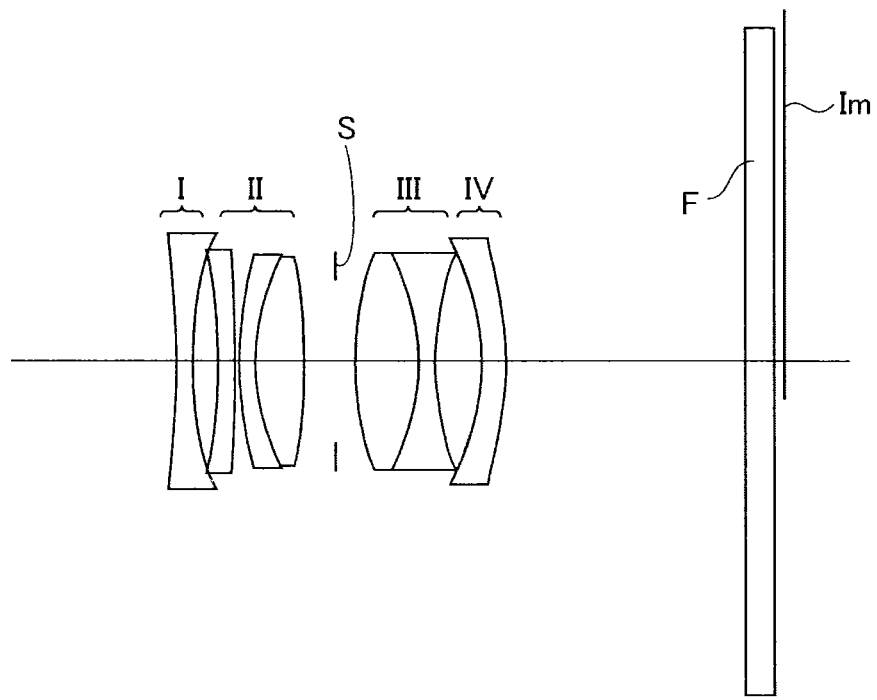
FIG. 1 is a cross-sectional diagram of a constitution of an imaging lens of Example 1.
Figure 2:
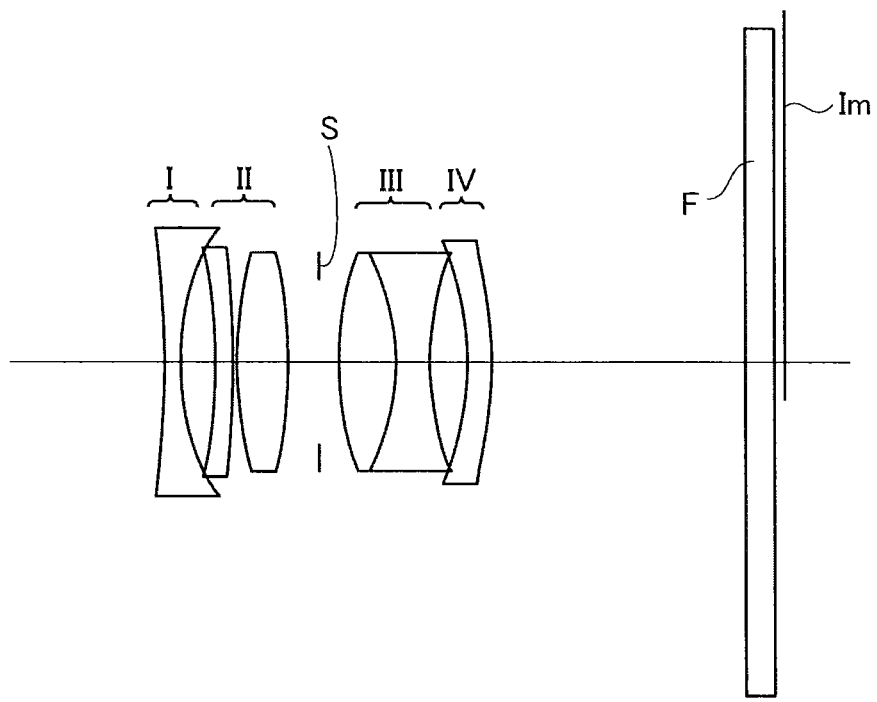
FIG. 2 is a cross-sectional diagram of a constitution of an imaging lens of Example 2.
Figure 3:
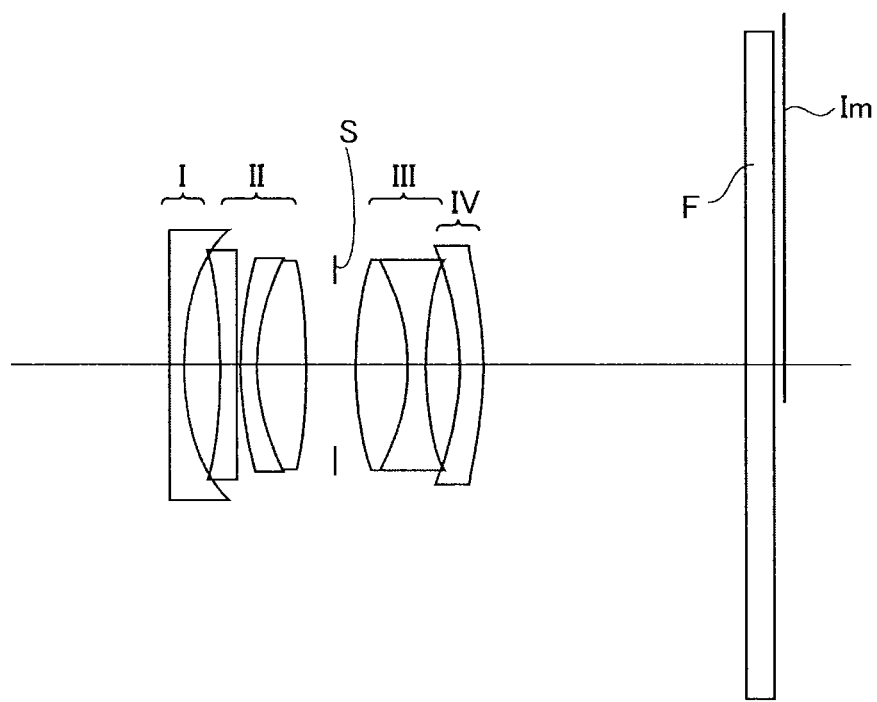
FIG. 3 is a cross-sectional diagram of a constitution of an imaging lens of Example 3.
Figure 4:
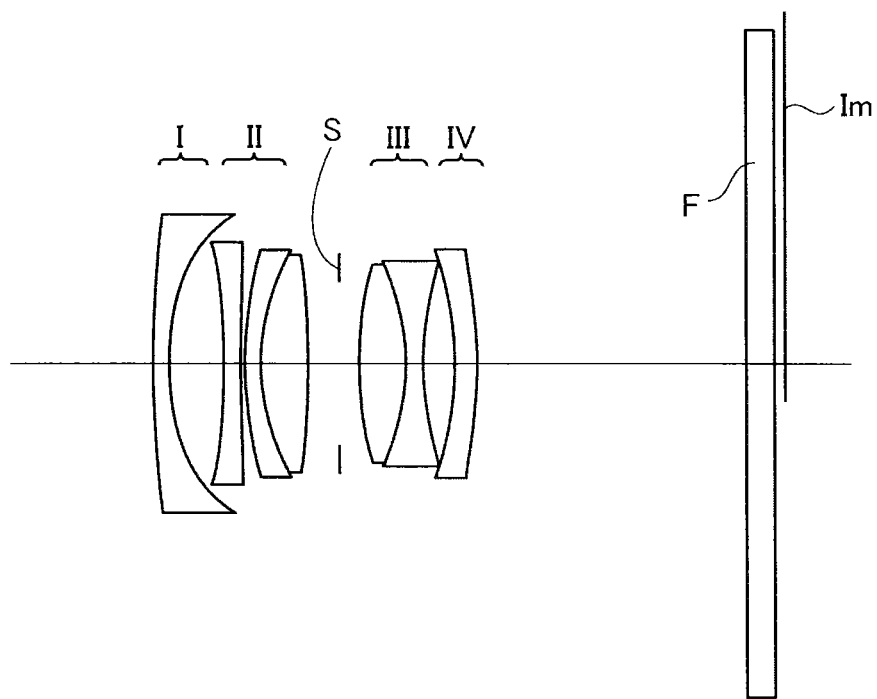
FIG. 4 is a cross-sectional diagram of a constitution of an imaging lens of Example 4.
Figure 5:
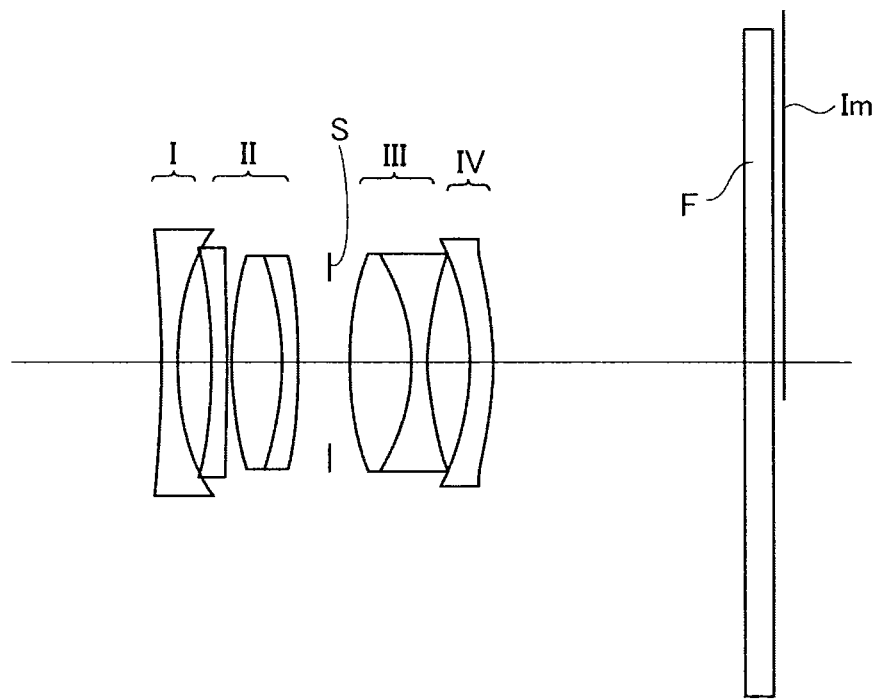
FIG. 5 is a cross-sectional diagram of a constitution of an imaging lens of Example 5.
Figure 6:
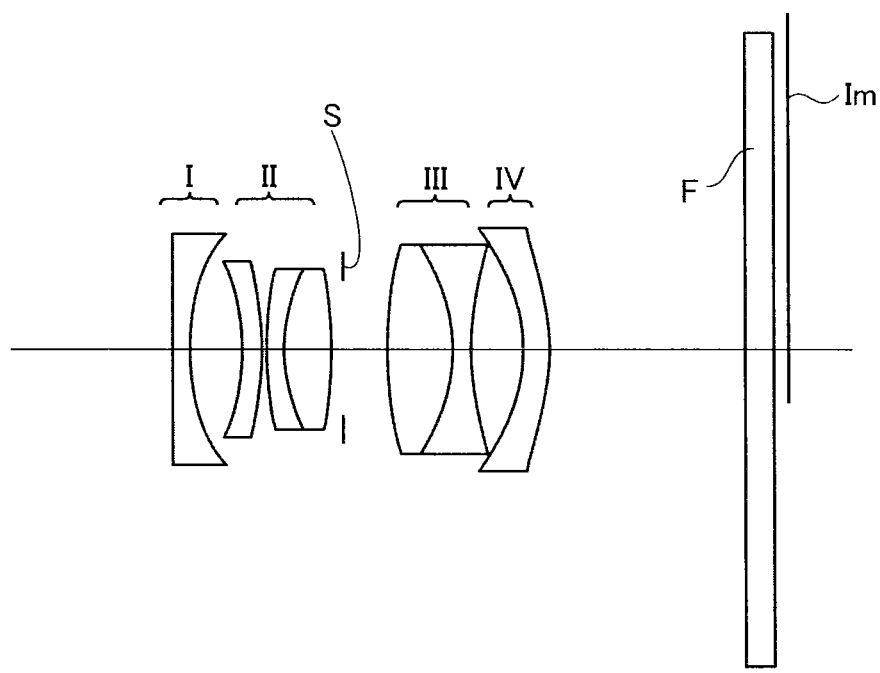
FIG. 6 is a cross-sectional diagram of a constitution of an imaging lens of Example 6.
Figure 8:
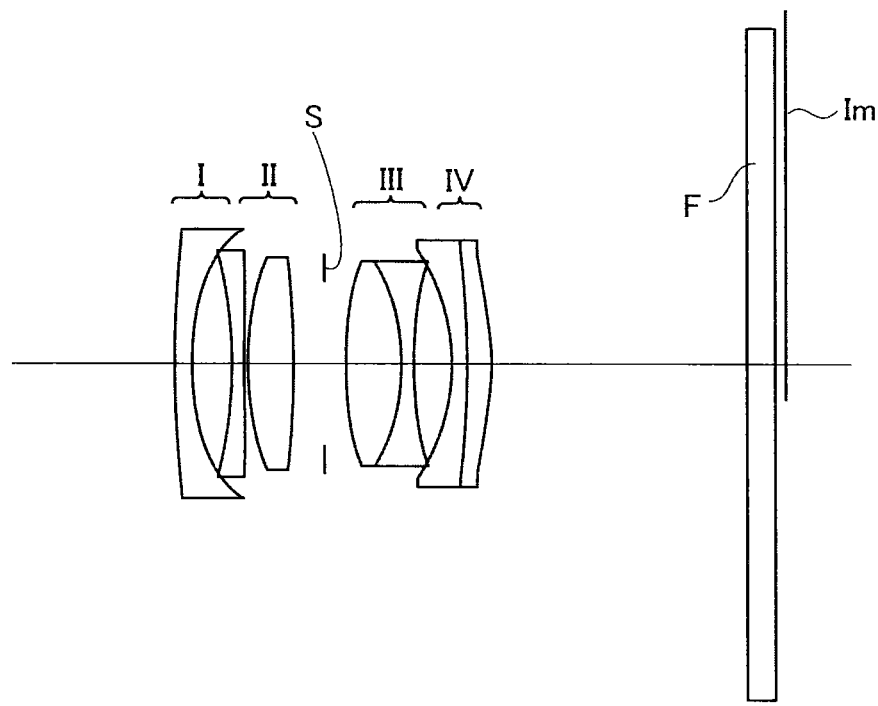
FIG. 8 is a cross-sectional diagram of a constitution of an imaging lens of Example 8.
Figure 9:
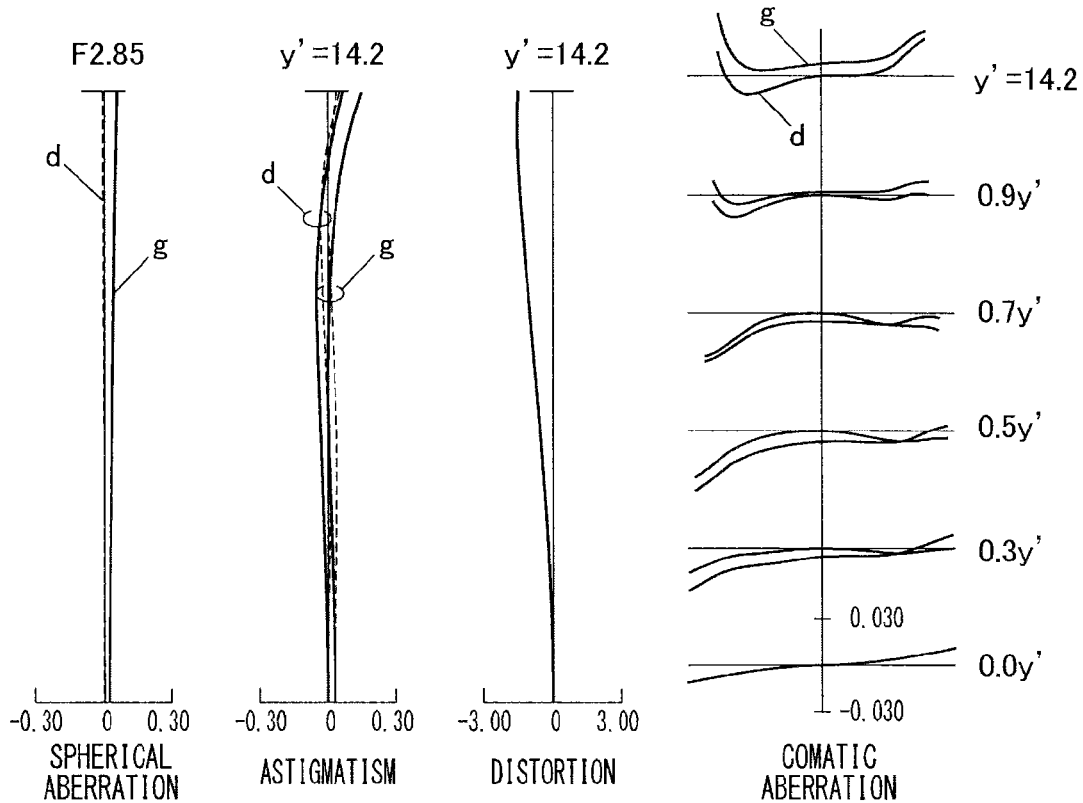
FIG. 9 illustrates diagrams of aberration curves of the imaging lens of Example 1.
Figure 10:
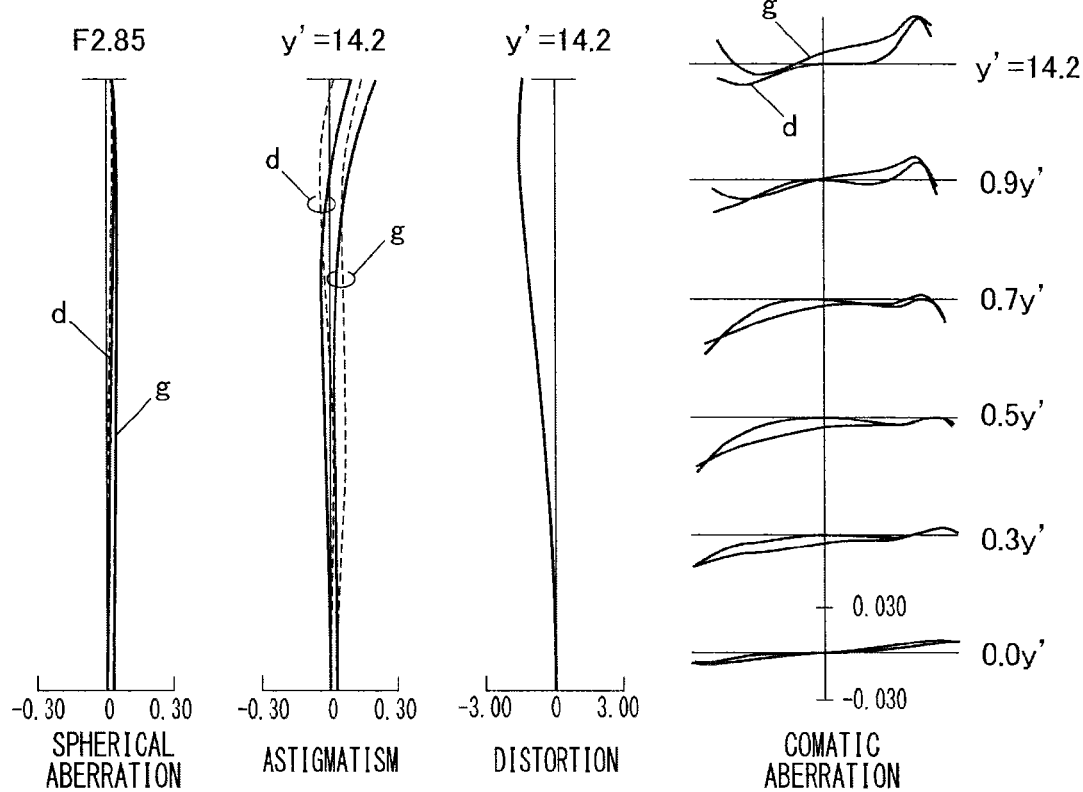
FIG. 10 illustrates diagrams of aberration curves of the imaging lens of Example 2.
Figure 11:
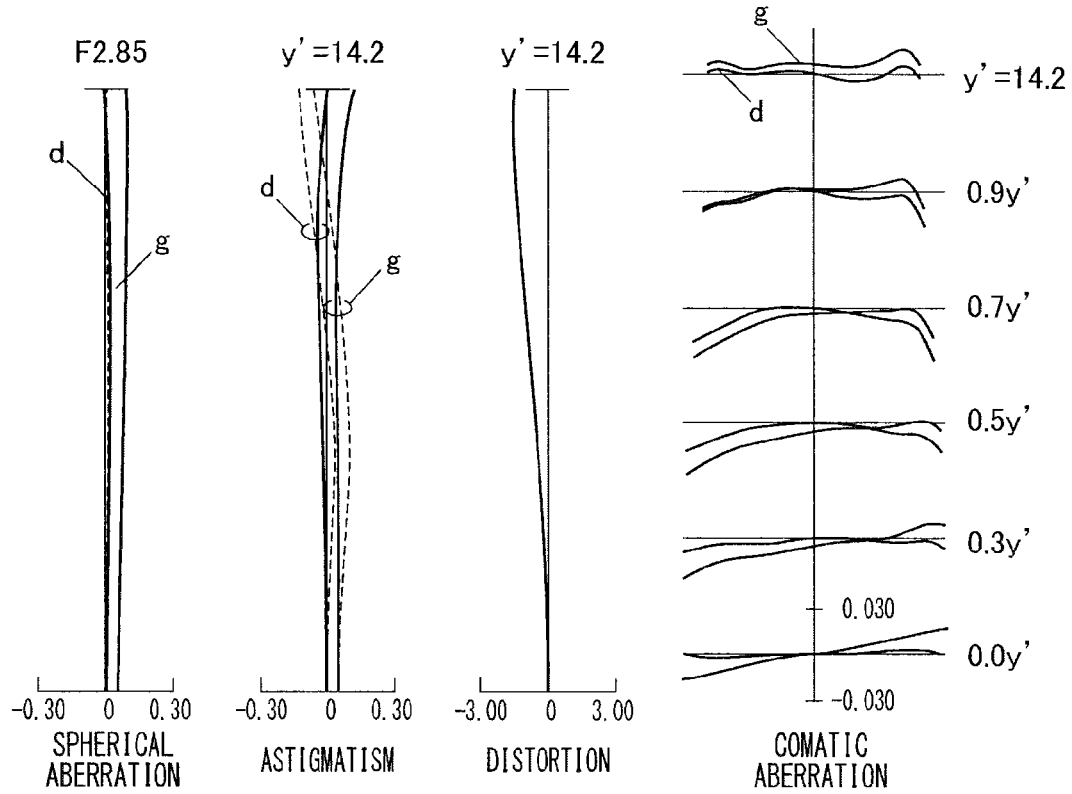
FIG. 11 illustrates diagrams of aberration curves of the imaging lens of Example 3.
Figure 12:
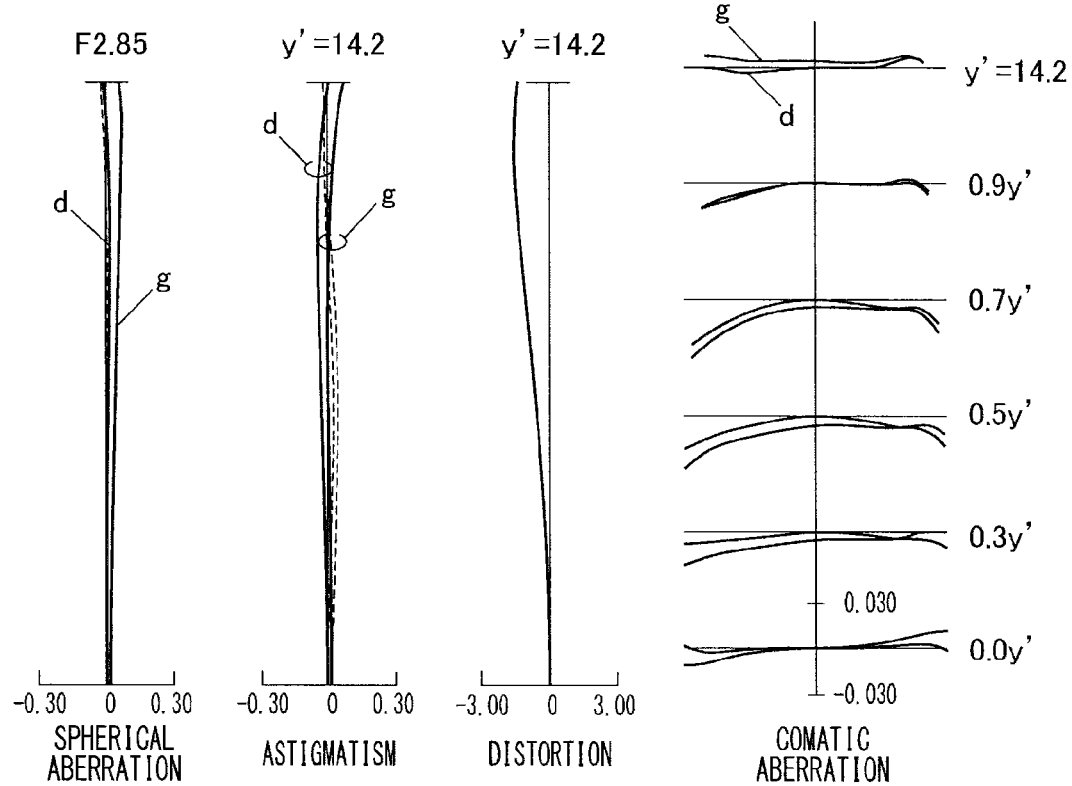
FIG. 12 illustrates diagrams of aberration curves of the imaging lens of Example 4.
Figure 13:
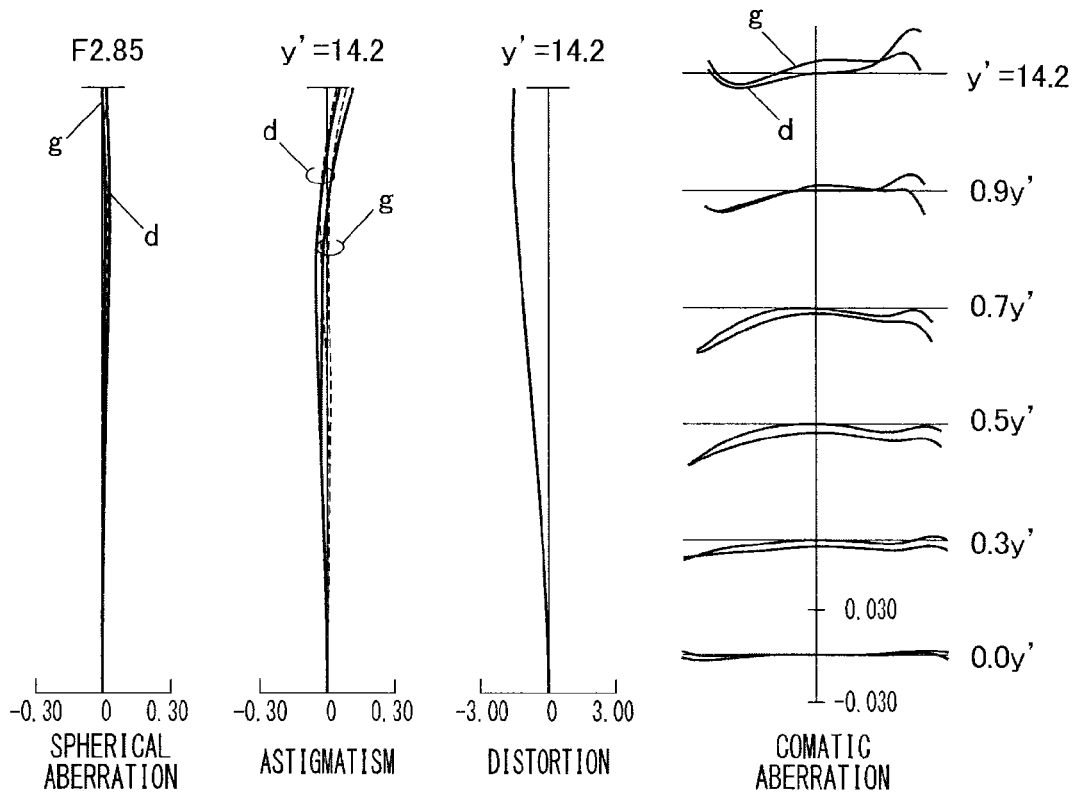
FIG. 13 illustrates diagrams of aberration curves of the imaging lens of Example 5.
Figure 14:
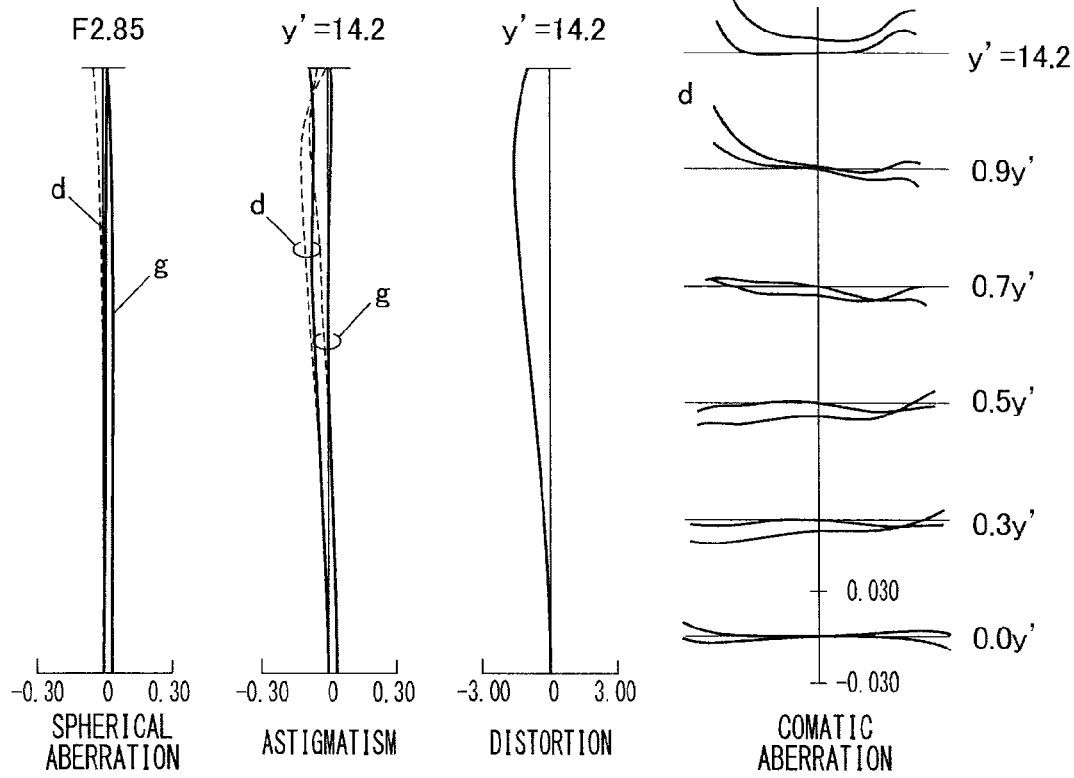
FIG. 14 illustrates diagrams of aberration curves of the imaging lens of Example 6.
Figure 15:
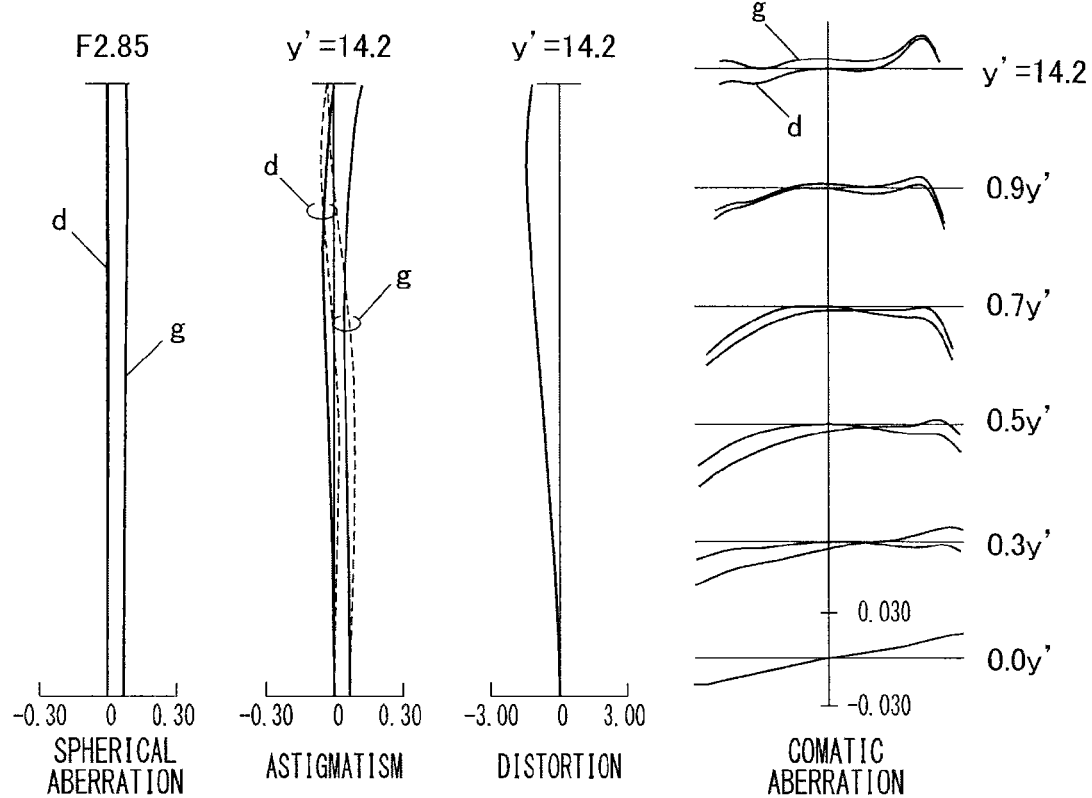
FIG. 15 illustrates diagrams of aberration curves of the imaging lens of Example 7.
Figure 16:
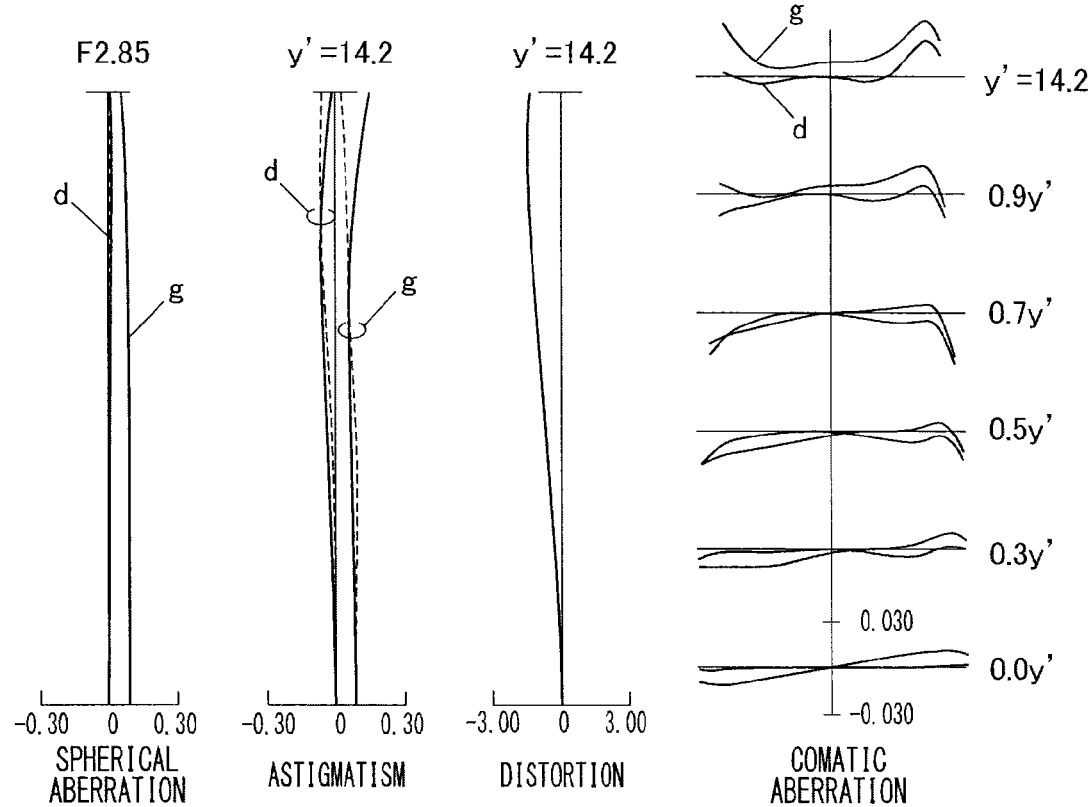
FIG. 16 illustrates diagrams of aberration curves of the imaging lens of Example 8.

In the examples illustrated in FIGS. 2 and 8, the second lens group II includes, from the object side to the image side in order, a negative lens a concave surface of which faces the object side, and a positive lens.

The third lens group III includes a cemented lens in which a biconvex lens and a biconcave lens are cemented from the object side to the image side in order. Therefore, a surface on the image side of the third lens group III is a concave surface.

The fourth lens group IV includes a single lens, or a cemented lens, and a surface on the object side is a concave surface, and a surface on the image side is a convex surface.

Figure 7:
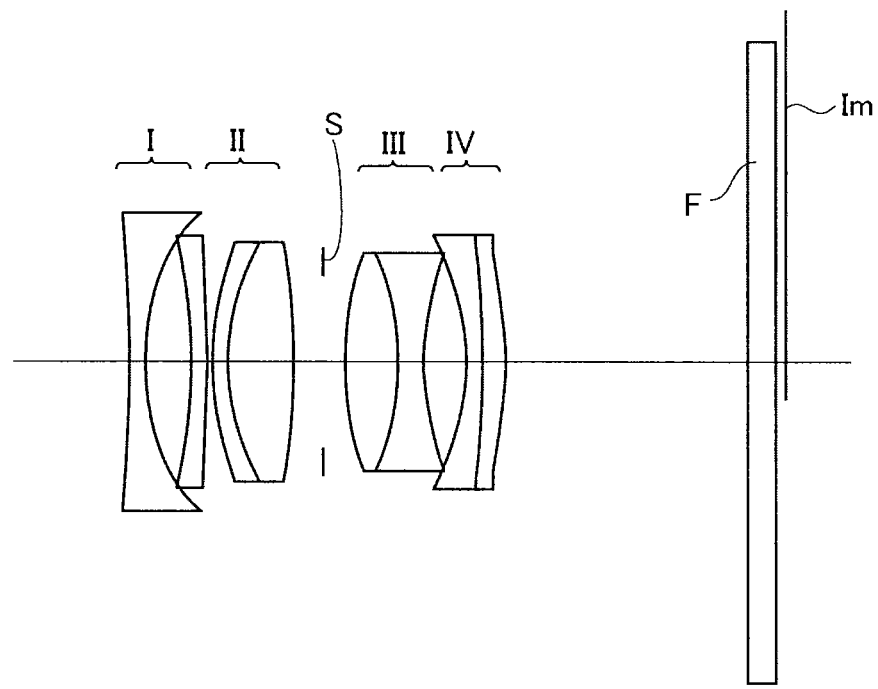
FIG. 7 is a cross-sectional diagram of a constitution of an imaging lens of Example 7.

The fourth lens group IV in each of the examples illustrated in FIGS. 1-6 includes a single lens, and the fourth lens group IV in each of the examples illustrated in FIGS. 7-8 includes a cemented lens. In each case, a surface on the object side is a concave surface, and a surface on the image side is a convex surface.

The fourth lens group IV has a weakest refractive power among the first-fourth lens groups. That is, an absolute value of the refractive power of the fourth lens group IV is smaller than an absolute value of a refractive power of each of the first-third lens groups.

The imaging lens according to the embodiment of the present invention is based on an approximately-symmetric-type power arrangement in which before and behind the aperture S, a positive power (the positive lens or the cemented lens having entirely the positive refractive power of the second lens group II, and the biconvex lens of the third lens group III), and on each outer side of the positive power, a negative power (the first lens group I, the negative lens the concave surface of which faces the object side of the second lens group II, the biconcave lens of the third lens group III, and the fourth lens group IV) are arranged, and this constitution makes it easy to correct comatic aberration, distortion, lateral chromatic aberration.

The refractive power of the fourth lens group IV is not limited to be negative, but may be positive. However, the refractive power of the fourth lens group IV is weakest among the other lens groups, and therefore, also in a case where the fourth lens group IV has a positive refractive power, power arrangement of the imaging lens is close to the above approximately-symmetric-type power arrangement.

Additionally, both of a surface on a most object side of the second lens group II and a surface on a most image side of the third lens group III are corresponded as concave surfaces, respectively, and both of a surface on the image side of the negative lens included in the first lens group I and a surface on a most object side of the fourth lens group IV are corresponded as concave surfaces, respectively, which makes it possible to achieve correction of the above aberrations to a higher level.

A space between the first lens group I and the second lens group II constitutes a biconvex air lens, and a space between the third lens group III and the fourth lens group IV also constitutes a biconvex air lens. Each of the biconvex air lenses has a negative refractive power, and distribution of the refractive power of each of the space between the first lens group I and the second lens group II and the space between the third lens group III and the fourth lens group IV is favorably adjusted.

Of the above constitutions, the surface of the most object side of the second lens group II being the concave surface has an effect to make a diameter of the first lens group I smaller, and make it easy to correct comatic aberration of a lower ray, and the surface of the most image side of the third lens group III being the concave surface has an effect to make a diameter of the fourth lens group IV smaller, and make it easy to correct comatic aberration of an upper ray, which makes it possible to be advantageous in miniaturization and high performance of the imaging lens.

The imaging lens according to the embodiment of the present invention is based on the approximately-symmetric-type power arrangement as described above; however, it is not a completely-symmetric-type. When the power arrangement is the completely-symmetric-type, there is disadvantage in high performance as a camera lens used in a reduced magnification.

In the embodiment of the present invention, separated negative and positive elements constitute the second lens group II, and therefore, degrees of freedom in various aberration correction are secured, and only a cemented lens of a positive lens and a negative lens constitutes the third lens group III facing the second lens group II across the aperture S, and therefore, an increase in a production error sensitivity is prevented, and ease of assembly is achieved.

Additionally, a cemented lens is used in each of the second lens group II and the fourth lens group IV when necessary, and it is possible to achieve correct lateral chromatic aberration and comatic aberration more favorably.

Furthermore, the fourth lens group IV has a power weaker than any other lens groups, and therefore, the position of the exit pupil is controlled, and it is possible to set the angle of the principal ray incident to the image plane in the peripheral image height to be in an appropriate state.

Thus, the imaging lens according to the embodiment of the present invention achieves a wide angle, a large diameter, miniaturization, and high performance.

The imaging lens according to the embodiment of the present invention having the above constitution preferably satisfies equal to or more than one of the following Conditional Expressions (1)-(10).

$$-0.2 < f_1/f_4 < 0.5 \quad (1)$$

$$0.3 < f_{1-2}/f_{3-4} < 2.5 \quad (2)$$

$$-2.2 < f_1/f < -0.8 \quad (3)$$

$$-1.5 < r_{2F}/f < -0.5 \quad (4)$$

$$0.5 < r_{3R}/f < 1.2 \quad (5)$$

$$1.75 < nd_{P2-3} < 2.0 \quad (6)$$

$$0.7 < Y'/f < 0.95 \quad (7)$$

$$0.6 < \tan(\theta P_{max}) < 0.95 \quad (8)$$

$$1.4 < L/f < 2.0 \quad (9)$$

$$0.7 < D_T/f < 1.2 \quad (10)$$

In the above Conditional Expressions, $f_1$ is "a focal length of the first lens group", $f_4$ is "a focal length of the fourth lens group", $f_{1-2}$ is "a combined focal length of the first and second lens groups", $f_{3-4}$ is "a combined focal length of the third and fourth lens groups", f is "a focal length of an entire system in a state of focusing on an object at infinity", $r_{2F}$ is "a curvature radius of the surface on the most object side of the second lens group", $r_{3R}$ is "a curvature radius of the surface on the most image side of the third lens group".

$Nd_{P2-3}$ is "an average of a refractive power of materials of positive lenses included in the second lens group and third lens group", Y' is "a maximum image height", and $\theta P_{max}$ is "an angle of a principal ray incident to an image plane that reaches a maximum image height". L is "a distance from a surface on a most object side of the first lens group to the image plane in a state of focusing on an object at infinity", and DT is "a distance from the surface on the most object side of the first lens group to a surface on a most image side of the fourth lens group".

Note that the surface on the most object side of the second lens group is the concave surface facing the object side, and therefore, the curvature radius of that: $r_{2F}$ is negative, and the surface on the most image side of the third lens group is the surface facing the image side, and the curvature radius of that: $r_{3R}$ is positive.

The meaning of Conditional Expressions (1)-(10) will be explained.

Conditional Expression (1) is a conditional expression that favorably balances refractive powers of the first and fourth lens groups. The refractive power of the first lens group is negative, and therefore, it is possible for the refractive power of the fourth lens group that satisfies Conditional Expression (1) to be negative or positive. Since the power of the fourth lens group is weakest, an absolute value of the focal length of the fourth lens group: $f_4$ is larger than an absolute value of the focal length of the other lens groups.

When a numerical value of a parameter of Conditional Expression (1) is less than or equal to a lower limit value: −0.2, a negative refractive power of the first lens group becomes relatively-large, a feature of a retrofocus-type as a lens system becomes strong, a principal point moves to an image side, and reduction of an entire length of the lens becomes difficult. Additionally, an exit pupil moves to an object side, and the fourth lens group tends to have a large diameter.

When a numerical value of the parameter of Conditional Expression (1) is equal to or more than an upper limit value: 0.5, the refractive powers of the first and fourth lens groups are both negative, the refractive power of the fourth lens group becomes large with respect to the refractive power of the first lens group, a feature of a telephoto-type as the lens system becomes strong, the principal point moves to the object side, the entire length of the lens becomes too short, and the degrees of freedom of the various aberration correction tends to be limited, or the production error sensitivity increases.

Additionally, the exit pupil moves to the image side, and the angle of the principal ray incident to the image plane in the peripheral image height tends to become large.

By satisfying Condition Expression (1), it is possible to improve miniaturization and high performance while controlling the position of the exit pupil.

It is more preferable that a numerical value of the parameter of Conditional Expression (1): $f_1/f_4$ satisfy the following Conditional Expression.

$$0.0 < f_1/f_4 < 0.4 \quad (1A)$$

By satisfying Conditional Expression (1A), it is possible to perform aberration correction more favorably.

Conditional Expression (2) is a conditional expression that favorably balances the refractive power before and after the aperture S.

When a numerical value of a parameter of Conditional Expression (2): $f_{1-2}/f_{3-4}$ is less than or equal to a lower limit value: 0.3, a refractive power on the object side (front side) with respect to the aperture S becomes relatively too strong with respect to a refractive power on the image side (rear side). Therefore, positive distortion tends to occur in a peripheral part, introverted comatic aberration tends to occur, and lateral chromatic aberration of the short wavelength tends to occur toward an inner side of an image.

When a numerical value of the parameter of Conditional Expression (2): $f_{1-2}/f_{3-4}$ is equal to or more than an upper limit value: 2.5, a refractive power on the image side with respect to the aperture S becomes relatively too strong with respect to a refractive power on the object side. Therefore, negative distortion tends to occur, extroverted comatic aberration tends to occur, and additionally, lateral chromatic aberration of the short wavelength tends to occur toward an outer side of the image.

By satisfying Conditional Expression (2), it is possible to achieve a small and high-performance imaging lens by which distortion, comatic aberration, and lateral chromatic aberration are favorably corrected, which makes distortion of an image unnoticeable, high resolution to the peripheral part, and there are hardly any color shift and color blur.

Conditional Expression (3) is a conditional expression that regulates a suitable range of the refractive power of the first lens group. When a numerical value of a parameter of Conditional Expression (3): $f_1/f$ becomes a level that is less than or equal to a lower limit value: −2.2, and the refractive power of the first lens group is weak, a field curvature tends to lack correction, and it is difficult to maintain flatness of the image plane.

On the other hand, when a numerical value of the parameter of Conditional Expression (3): $f_1/f$ becomes a level that is equal to or more than an upper limit value: −0.8, and the refractive power of the first lens group is strong, astigmatism and comatic aberration tend to remain, and it is difficult to maintain high imaging performance to the peripheral part.

By satisfying Conditional Expression (3), it is possible to sufficiently reduce the field curvature, and achieve the flatness of the image plane highly, and high contrast to the peripheral part of the image.

Conditional Expression (4) is a conditional expression that regulates a suitable range of the curvature radius of the surface on the most object side of the second lens group: $r_{2F}$. Since the surface on the most object side of the second lens group is the concave surface, the smaller a value (absolute value) of the curvature radius: $r_{2F}$ is, the larger a negative power of the lens surface is.

When a numerical value of a parameter of Conditional Expression (4) is less than or equal to a lower limit value: −1.5, comatic aberration (comatic flare) of a lower ray tends to occur in a positive direction at an intermediate image height, and astigmatism tends to occur. An off-axis ray passing through the first lens group passes through a high position, and it is easy for the first lens group to have a large diameter.

When a numerical value of the parameter of Conditional Expression (4) is equal to or more than an upper limit value: −0.5, the comatic aberration (comatic flare) of the lower ray tends to occur in a negative direction at the intermediate image height, and spherical aberration in a positive direction tends to occur.

By satisfying Conditional Expression (4), it is possible to correct astigmatism and comatic aberration more favorably, and achieve a more uniform image quality in an entire image.

Conditional Expression (5) is a conditional expression that regulates a suitable range of the curvature radius of the surface on the most image side of the third lens group: $r_{3R}$. The surface on the most image side of the third lens group is also the concave surface, and the smaller a value of the curvature radius: $r_{3R}$ is, the larger a negative power of the lens surface is.

When a numerical value of a parameter of Conditional Expression (5) is less than or equal to an upper limit value: 0.5, comatic aberration (comatic flare) of an upper ray is likely to occur in a positive direction at a peripheral image height, and field curvature is likely to be corrected excessively.

On the other hand, when a numerical value of the parameter of Conditional Expression (5) is equal to or more than the upper limit value: 1.2, the comatic aberration (comatic flare) of the upper ray tends to occur in a negative direction at the peripheral image height, and astigmatism tends to occur. Additionally, an off-axis ray passing through the fourth lens group passes through the high position, and it is easy for the fourth lens group to have a large diameter.

By satisfying Conditional Expression (5), it is possible to correct various aberration more favorably, and achieve a high-performance imaging lens more suitable for miniaturization.

Conditional Expression (6) is a conditional expression that relates to favorable correction of field curvature and comatic aberration.

When a numerical value of a parameter of Conditional Expression (6): $nd_{P2-3}$ is less than or equal to a lower limit value: 1.75, the field curvature tends to lack correction, and introverted comatic aberration tends to remain at an intermediate image height.

Note that an upper limit value of the numerical value of the parameter of Conditional Expression (6) is approximately 2.0-2.1 in consideration of a refractive index range and costs of existing optical glasses.

By satisfying Conditional Expression (6), it is possible to perform various aberration correction more favorably.

Conditional Expression (7) is a conditional expression that regulates an angle of view in which an effect of the present invention is best exerted, and Conditional Expression (8) is a conditional expression that regulates an angle of an off-axis ray of the imaging lens incident onto the image plane in which the effect of the present invention is best exerted.

By satisfying Conditional Expressions (7) and (8), the angle of the principal ray incident onto the image plane that reaches the maximum image height is approximately the same as the half angle of view (35-40 degrees, or approximately 43 degrees), and it is possible to achieve miniaturization and a wide angle.

By satisfying Conditional Expressions (9) and (10), it is possible to achieve miniaturization by shortening the entire length and thickness of the lens, and best exert an effect on the large diameter, wide angle, and high performance.

In addition, as the constitution of the imaging lens, it is preferable that a surface on a most image side of the second lens group and a surface of a most object side of the third lens group be both convex surfaces.

As described above, the imaging lens according to the embodiment of the present invention is based on an approximately-symmetric-type refractive power arrangement, and two surfaces facing each other across the aperture are also arranged in the manner of the approximately-symmetric-type refractive power arrangement, and therefore, it is possible to correct comatic aberration, distortion, and lateral chromatic aberration at an extremely high level.

It is preferable that a curvature radius of the surface on the most image side of the second lens group: $r_{2R}$ (<0), and a curvature radius of the surface on the most object side of the third lens group: $r_{3F}$ (>0) satisfy the following Conditional Expression.

$$-4.0 < r_{2R}/r_{3F} < -0.8 \quad (11)$$

If a numerical value of a parameter of Conditional Expression (11): $r_{2R}/r_{3F}$ is in the above range, it can be said that the two surfaces facing each other across the aperture are in the approximately-symmetric-type refractive power arrangement.

Additionally, it is preferable that an Abbe number of a material of a negative lens constituting the first lens group: $vd_{n1}$ satisfy the following Conditional Expression.

$$55 < vd_{n1} < 85 \quad (12)$$

When a numerical value of a parameter of Conditional Expression (12) is less than or equal to a lower limit value: 55, it is difficult to favorably correct both axial chromatic aberration and lateral chromatic aberration while maintaining a balance of chromatic aberration correction. Additionally, an optical material in which a numerical value of the parameter of Conditional Expression (12) is equal to or more than an upper limit value: 85 is generally soft, easy to be scratched, and low in chemical durability, which is not suitable for a lens on the most object side that is exposed to the outside.

In order to perform aberration correction more favorably, it is preferable to use an aspheric surface for the first lens group and the fourth lens group. The employment of the aspheric surface has a great effect in correction of astigmatism, comatic aberration, and distortion.

Before describing specific examples of the imaging lens, with reference to FIGS. 17, 18A, 18B, and 18C, a portable information terminal device according to an embodiment of the present invention will be explained.

As illustrated in FIG. 17, a portable information terminal device 30 has a photographing lens 31 as an imaging lens, and a light-receiving element (area sensor) 45 as an image sensor, and is configured to read an image of a photographic subject formed by the photographing lens 31 by the light-receiving element 45. As the photographing lens, in particular, any one of imaging lenses in later-described examples 1-8 is used.

An output from the light-receiving element 45 is processed by a signal processor 42 controlled by a central processing unit (CPU) 40, and converted to digital information.

Image information digitized by the signal processor 42 is stored in a semiconductor memory 44, after performing predetermined image processing in an image processor 41 controlled by the CPU 40.

A liquid crystal display (LCD) monitor 38 displays an image of a photographic subject while photographing, and also displays an image stored in the semiconductor memory 44. Additionally, the image stored in the semiconductor memory 44 can be transmitted to an external device by use of a communication card, etc 43.

When carrying the camera, the photographing lens 31 as the imaging lens is in a collapsed state as illustrated in FIG. 18A, and when a user operates a power switch 36 and the power is turned on, a lens barrel is extended as illustrated in FIG. 18B.

Focusing is performed by half-pressing a shutter button 35.

Focusing on an object at a close distance from an object at infinity is performed by moving an entire lens groups, or by moving the image sensor to match an imaging plane. At this time, in conjunction with the above, focusing operation is also performed at a viewfinder 33.

By pressing the shutter button 35 further, photographing is performed, and the above-described operation is performed.

When displaying an image stored in the semiconductor memory 44, or transmitting the image to an external device by use of communication card, etc 43, an operation button 37 is used.

The semiconductor memory 44 and the communication card, etc 43 are inserted into exclusive or general slots 39A, 39B, respectively, and used.

Note that when the photographing lens 31 is in the collapsed state, each of the lens groups I-IV of the imaging lens is not always aligned on an optical axis. For example, if the photographing lens 31 has a mechanism such that the third lens group III and the fourth lens group IV are retracted from a position on the optical axis, and stored in parallel with the first lens I and the second lens II, it is possible to achieve a thinner portable information terminal device.

Note that a part other than a communication function part as described above in the portable information terminal device is a camera function part, and it is needless to say that it is possible for the camera function part to be configured as an independent camera.

As described above, in the above portable information terminal device, as the imaging lens of the camera function part, an arbitrary one of the following examples 1-8 can be used, and it is possible to achieve a small camera or portable information terminal device with high image quality that uses a 12-24 megapixel image sensor.

EXAMPLES

Hereinafter, eight specific examples of the imaging lens according to the embodiment of the present invention will be described. Note that in all the examples, a maximum image height is 14.2 mm. That is, it is envisaged that an image sensor used for imaging has a diagonal length of the light-receiving surface of 28.5 mm.

The meaning of each reference sign in the examples is as follows.

f: a focal length of an entire lens system
F: F-number

ω: a half angle of view
R: a curvature radius
D: an interval between surfaces
Nd: a refractive index
Nd: an Abbe number
Pg, F: a partial dispersion ratio [Pg, F=(ng−nF)/(nF−nC)]
K: a conic constant of an aspheric surface
A4: an aspheric coefficient of the 4th order
A6: an aspheric coefficient of the 6th order
A8: an aspheric coefficient of the 8th order
A10: an aspheric coefficient of the 10th order An aspheric surface: X is expressed by the following known expression by using a reciprocal of paraxial radius curvature (paraxial radius): C, height from an optical axis: H, the above conic constant: K, aspheric coefficients: A4-A10.

$$X = CH^2/[1+\sqrt{\{(1-(1+K)C^2H^2)\}}] + A4 \cdot H^4 + A6 \cdot H^6 + A8 \cdot H^8 + A10 \cdot H^{10}$$

Note that unit of quantity with dimensions of length is mm. Note that any glass names in the following examples are names of products.

Example 1

13th Surface
  $K=-2.16285$, $A4=1.26506\times10^{-4}$, $A6=3.79544\times10^{-6}$, $A8=8.67908\times10^{-8}$, $A10=-3.66733\times10^{-10}$ Numerical Values of Parameters of Conditional Expressions $f_1/f_4=0.168$ (1)

$f_{1-2}f_{3-4}=0.733$ (2)

$f_1/f=-1.227$ (3)

$r_{2F}/f=-1.095$ (4)

$r_{3R}/f=0.698$ (5)

$nd_{P2-3}=1.835$ (6)

$Y'/f=0.775$ (7)

$\tan(\theta P_{max})=0.763$ (8)

$L/f=1.632$ (9)

$D_T/f=0.888$ (10)

$r_{2R}/r_{3F}=1.573$ (11)

$\nu d_{n1}=59.46$ (12)

f = 18.32, F = 2.85, ω = 38.2

| SURFACE NUMBER | R | D | Nd | vd | Pg, F | GLASS NAME |
|---|---|---|---|---|---|---|
| 01 | −35.692 | 0.80 | 1.58313 | 59.46 | 0.5404 | HOYA M-BACD12 |
| 02* | 20.888 | 1.33 | | | | |
| 03 | −20.058 | 0.80 | 1.71736 | 29.50 | 0.6033 | HOYA E-FD1 |
| 04 | −68.248 | 0.20 | | | | |
| 05 | 17.593 | 0.80 | 1.76182 | 26.61 | 0.6122 | HOYA FD140 |
| 06 | 9.640 | 2.44 | 1.83481 | 42.72 | 0.5653 | HOYA TAFD5F |
| 07 | −22.161 | 1.52 | | | | |
| 08 | APERTURE | 1.00 | | | | |
| 09 | 14.090 | 3.10 | 1.83481 | 42.72 | 0.5653 | HOYA TAFD5F |
| 10 | −9.782 | 0.81 | 1.67270 | 32.17 | 0.5962 | HOYA E-FD5 |
| 11 | 12.779 | 2.26 | | | | |
| 12 | −10.864 | 1.20 | 1.80610 | 40.73 | 0.5693 | HOYA M-NBFD130 |
| 13* | −12.678 | 11.730 | | | | |
| 14 | ∞ | 1.40 | 1.51680 | 64.20 | | FILTER |
| 15 | ∞ | | | | | |

Aspheric surface (a surface with an asterisk in the above data, and the same is applied to the following examples) data is as follows.
Aspheric Surface Data
Second Surface
  $K=7.01177$, $A4=1.70754\times10^{-4}$, $A6=-3.41940\times10^{-7}$, $A8=1.25705\times10^{-7}$, $A10=-2.19437\times10^{-9}$

Example 2 f = 18.34, F = 2.88, ω = 38.2

| SURFACE NUMBER | R | D | Nd | vd | Pg, F | GLASS NAME |
|---|---|---|---|---|---|---|
| 01 | −36.757 | 0.80 | 1.48749 | 70.45 | 0.5306 | HOYA FC5 |
| 02* | 14.461 | 1.79 | | | | |
| 03 | −19.505 | 0.80 | 1.84666 | 23.78 | 0.6191 | HOYA FDS90 |
| 04 | −45.354 | 0.20 | | | | |
| 05 | 16.326 | 2.54 | 1.77250 | 49.62 | 0.5503 | HOYA TAF1 |
| 06 | −22.028 | 1.52 | | | | |
| 07 | APERTURE | 1.00 | | | | |
| 08 | 13.757 | 2.89 | 1.83481 | 42.72 | 0.5653 | HOYA TAFD5F |
| 09 | −8.979 | 1.65 | 1.68893 | 31.16 | 0.5989 | HOYA E-FD8 |
| 10 | 13.233 | 1.86 | | | | |
| 11 | −12.445 | 1.20 | 1.83441 | 37.28 | 0.5772 | HOYA M-NBFD10 |
| 12* | −13.926 | 12.441 | | | | |

-continued

| | f = 18.34, F = 2.88, ω = 38.2 | | | | | |
|---|---|---|---|---|---|---|
| SURFACE NUMBER | R | D | Nd | vd | Pg, F | GLASS NAME |
| 13 | ∞ | 1.40 | 1.51680 | 64.20 | | FILTER |
| 14 | ∞ | | | | | |

Aspheric Surface Data
Second Surface
 K=3.79018, A4=1.47147×10$^{-4}$, A6=−1.66166×10$^{-6}$, A8=1.59220×10$^{-7}$, A10=−3.48523×10$^{-9}$
12th Surface
 K=−2.38795, A4=1.75179×10$^{-4}$, A6=4.15425×10$^{-7}$, A8=1.26254×10$^{-7}$, A10=−7.36910×10$^{-10}$
Numerical Values of Parameters of Conditional Expressions $f_1/f_4 = 0.095$ (1)

$f_{1-2}/f_{3-4} = 1.243$ (2)

$f_1/f = -1.155$ (3)

$r_{2F}/f = -1.064$ (4)

$r_{3R}/f = -0.722$ (5)

$nd_{P2-3} = 1.804$ (6)

$Y'/f = 0.774$ (7)

$\tan(\theta P_{max}) = 0.749$ (8)

$L/f = 1.668$ (9)

$D_T/f = 0.886$ (10)

$r_{2R}/r_{3F} = -1.601$ (11)

$vd_{n1} = 70.45$ (12)

Example 3

| | f = 18.30, F = 2.81, ω = 38.2 | | | | | |
|---|---|---|---|---|---|---|
| SURFACE NUMBER | R | D | Nd | vd | Pg, F | GLASS NAME |
| 01 | 816.141 | 0.80 | 1.49710 | 81.56 | 0.5388 | HOYA M-FCD1 |
| 02* | 13.666 | 1.79 | | | | |
| 03 | −23.543 | 0.80 | 1.68893 | 31.16 | 0.5989 | HOYA E-FD8 |
| 04 | 200.425 | 0.20 | | | | |
| 05 | 15.416 | 0.80 | 1.84666 | 23.78 | 0.6191 | HOYA FDS90 |
| 06 | 9.513 | 2.34 | 1.88300 | 40.80 | 0.5654 | HOYA TAFD30 |
| 07 | −34.121 | 1.50 | | | | |
| 08 | APERTURE | 1.00 | | | | |
| 09 | 14.691 | 2.59 | 1.88300 | 40.80 | 0.5654 | HOYA TAFD30 |
| 10 | −9.087 | 0.89 | 1.68893 | 31.16 | 0.5989 | HOYA E-FD8 |
| 11 | 12.917 | 1.73 | | | | |
| 12 | −12.419 | 1.20 | 1.82080 | 42.71 | 0.5642 | HOYA M-TAFD51 |
| 13* | −13.832 | 12.756 | | | | |
| 14 | ∞ | 1.40 | 1.51680 | 64.20 | | FILTER |
| 15 | ∞ | | | | | |

Aspheric Surface Data
Second Surface
 K=3.80085, A4=1.07069×10$^{-4}$, A6=−3.38949×10$^{-6}$, A8=2.19205×10$^{-7}$, A10=−5.16455×10$^{-9}$
13th Surface
 K=−2.86234, A4=1.49055×10$^{-4}$, A6=418583×10$^{-6}$, A8=1.25343×10$^{-7}$, A10=−7.88154×10$^{-10}$
Numerical Values of Parameters of Conditional Expressions $f_1/f_4 = 0.117$ (1)

$f_{1-2}/f_{3-4} = 1.203$ (2)

$f_1/f = -1.529$ (3)

$r_{2F}/f = -1.287$ (4)

$r_{3R}/f = 0.706$ (5)

$nd_{P2-3} = 1.883$ (6)

$Y'/f = 0.776$ (7)

$\tan(\theta P_{max}) = 0.746$ (8)

$L/f = 1.656$ (9)

$D_T/f = 0.855$ (10)

$r_{2R}/r_{3F} = -2.323$ (11)

$vd_{n1} = 81.56$ (12)

Example 4

| f = 18.32, F = 2.82, ω = 38.2 | | | | | | |
|---|---|---|---|---|---|---|
| SURFACE NUMBER | R | D | Nd | νd | Pg, F | GLASS NAME |
| 01 | 50.000 | 0.80 | 1.48749 | 70.45 | 0.5306 | HOYA FC5 |
| 02* | 12.233 | 2.72 | | | | |
| 03 | −24.379 | 0.80 | 1.62588 | 35.74 | 0.5877 | HOYA E-F1 |
| 04 | 77.306 | 0.20 | | | | |
| 05 | 16.097 | 0.80 | 1.80518 | 25.46 | 0.6156 | HOYA FD60 |
| 06 | 9.256 | 2.39 | 1.88300 | 40.80 | 0.5654 | HOYA TAFD30 |
| 07 | −37.720 | 1.51 | | | | |
| 08 | APERTURE | 1.00 | | | | |
| 09 | 14.655 | 2.44 | 1.88300 | 40.80 | 0.5654 | HOYA TAFD30 |
| 10 | −9.325 | 0.80 | 1.68893 | 31.16 | 0.5989 | HOYA E-FD8 |
| 11 | 12.454 | 1.59 | | | | |
| 12 | −13.674 | 1.20 | 1.82080 | 42.71 | 0.5642 | HOYA M-TAFD51 |
| 13* | −15.035 | 13.084 | | | | |
| 14 | ∞ | 1.40 | 1.51680 | 64.20 | | FILTER |
| 15 | ∞ | | | | | |

Aspheric Surface Data
Second Surface
K=2.13028, A432 9.86836×10$^{-5}$, A6=−9.74939×10$^{-8}$, A8=4.88682×10$^{-9}$, A10=−1.11860×10$^{-10}$
13th Surface
K=−2.63168, A4=1.86803×10-4, A6=3.76968×10$^{-6}$, A8=1.35267×10$^{-7}$, A10=−1.07927×10$^{-9}$ Numerical Values of Parameters of Conditional Expressions $f_1/f_4 = 0.110$ (1)

$f_{1-2}/f_{3-4} = 1.059$ (2)

$f_1/f = -1.826$ (3)

$r_{2F}/f = -1.331$ (4)

$r_{3R}/f = 0.680$ (5)

$nd_{P2-3} = 1.883$ (6)

$Y'/f = 0.775$ (7)

$\tan(\theta P_{max}) = 0.751$ (8)

$L/f = 1.705$ (9)

$D_T/f = 0.887$ (10)

$r_{2R}/r_{3F} = -2.574$ (11)

$\nu d_{n1} = 70.45$ (12)

Example 5

| f = 18.34, F = 2.86, ω = 38.2 | | | | | | |
|---|---|---|---|---|---|---|
| SURFACE NUMBER | R | D | Nd | νd | Pg, F | GLASS NAME |
| 01 | −51.599 | 0.80 | 1.48749 | 70.45 | 0.5306 | HOYA FC5 |
| 02* | 16.200 | 1.62 | | | | |
| 03 | −20.195 | 0.80 | 1.74077 | 27.76 | 0.6076 | HOYA E-FD13 |
| 04 | −77.866 | 0.20 | | | | |
| 05 | 17.381 | 2.39 | 1.83481 | 42.72 | 0.5653 | HOYA TAFD5F |
| 06 | −14.223 | 0.80 | 1.76182 | 26.61 | 0.6122 | HOYA FD140 |
| 07 | −26.356 | 1.51 | | | | |
| 08 | APERTURE | 1.00 | | | | |
| 09 | 13.693 | 3.11 | 1.83481 | 42.72 | 0.5653 | HOYA TAFD5F |
| 10 | −8.619 | 0.80 | 1.67270 | 32.17 | 0.5962 | HOYA E-FD5 |
| 11 | 12.644 | 2.02 | | | | |
| 12 | −12.120 | 1.20 | 1.80610 | 40.73 | 0.5693 | HOYA M-NBFD130 |
| 13* | −13.772 | 12.28 | | | | |
| 14 | ∞ | 1.40 | 1.51680 | 64.20 | | FILTER |
| 15 | ∞ | | | | | |

Aspheric Surface Data
Second Surface
K=3.42630, A4=1.82031×10$^{-4}$, A6=2.87806×10$^{-8}$, A8=1.09332×10$^{-7}$, A10=−1.1934×10$^{-9}$
13th Surface
K=−2.05587, A4=1.76087×10$^{-4}$, A6=3.91574×10$^{-6}$, A8=1.04887×10$^{-7}$, A10=−4.66251×10$^{-10}$ Numerical Values of Parameters of Conditional Expressions $f_1/f_4 = 0.136$ (1)

$f_{1-2}/f_{3-4} = 1.097$ (2)

$f_1/f = -1.374$ (3)

$r_{2F}/f = -1.101$ (4)

$r_{3R}/f = 0.689$ (5)

$nd_{P2-3} = 1.835$ (6)

$Y'/f = 0.774$ (7)

$\tan(\theta P_{max}) = 0.749$ (8)

$L/f=1.659$ (9)

$D_T/f=0.886$ (10)

$r_{2R}/r_{3F}=-1.925$ (11)

$vd_{n1}=70.45$ (12)

Example 6

| | f = 15.72, F = 2.86, ω = 42.4 | | | | | |
|---|---|---|---|---|---|---|
| SURFACE NUMBER | R | D | Nd | vd | Pg, F | GLASS NAME |
| 01 | 173.256 | 0.80 | 1.48749 | 70.45 | 0.5306 | HOYA FC5 |
| 02* | 13.644 | 2.39 | | | | |
| 03 | −10.681 | 0.85 | 1.75520 | 27.53 | 0.6090 | HOYA E-FD4 |
| 04 | −16.894 | 0.20 | | | | |
| 05 | 21.763 | 0.80 | 1.78472 | 25.72 | 0.6157 | HOYA FD110 |
| 06 | 8.821 | 2.11 | 1.88300 | 40.80 | 0.5654 | HOYA TAFD30 |
| 07 | −20.684 | 0.51 | | | | |
| 08 | APERTURE | 2.00 | | | | |
| 09 | 18.713 | 2.97 | 1.88300 | 40.80 | 0.5654 | HOYA TAFD30 |
| 10 | −8.715 | 0.80 | 1.68893 | 31.16 | 0.5989 | HOYA E-FD8 |
| 11 | 15.001 | 2.37 | | | | |
| 12 | −9.020 | 1.20 | 1.85135 | 40.10 | 0.5694 | HOYA M-TAFD305 |
| 13* | −10.944 | 8.849 | | | | |
| 14 | ∞ | 1.40 | 1.51680 | 64.20 | | FILTER |
| 15 | ∞ | | | | | |

Aspheric Surface Data
Second Surface
  K=3.64665, A4=1.55190×10$^{-4}$, A6=496963×10$^{-6}$, A8=−2.61329×10$^{-7}$, A10=1.11640×10$^{-8}$
13th Surface
  K=−1.73578, A4=1.34058×10$^{-4}$, A6=4.52767×10$^{-6}$, A8=1.10405×10$^{-7}$, A10=−9.84332×10$^{-10}$
Numerical Values of Parameters of Conditional Expressions $f_1/f_4=0.360$ (1)

$f_{1-2}/f_{3-4}=0.349$ (2)

$f_1/f=-1.936$ (3)

$r_{2F}/f=-0.679$ (4)

$r_{3R}/f=0.954$ (5)

$nd_{P2-3}=1.883$ (6)

$Y'/f=0.903$ (7)

$\tan(\theta P_{max})=0.899$ (8)

$L/f=1.765$ (9)

$D_T/f=1.081$ (10)

$r_{2R}/r_{3F}=-1.105$ (11)

$vd_{n1}=70.45$ (12)

Example 7

| | f = 18.30, F = 2.56, ω = 38.2 | | | | | |
|---|---|---|---|---|---|---|
| SURFACE NUMBER | R | D | Nd | vd | Pg, F | GLASS NAME |
| 01 | −70.091 | 0.80 | 1.84749 | 70.45 | 0.5306 | HOYA FC5 |
| 02* | 14.457 | 2.23 | | | | |
| 03 | −22.847 | 0.80 | 1.69895 | 30.05 | 0.6028 | HOYA E-FD15 |
| 04 | −61.517 | 0.20 | | | | |
| 05 | 14.340 | 0.80 | 1.80518 | 25.46 | 0.6156 | HOYA FD60 |
| 06 | 10.587 | 3.23 | 1.77250 | 49.62 | 0.5503 | HOYA TAF1 |
| 07 | −35.067 | 1.51 | | | | |
| 08 | APERTURE | 1.00 | | | | |
| 09 | 14.535 | 2.69 | 1.88300 | 40.80 | 0.5654 | HOYA TAFD30 |
| 10 | −12.184 | 1.28 | 1.68893 | 31.16 | 0.5989 | HOYA E-FD8 |
| 11 | 14.266 | 2.04 | | | | |
| 12 | −11.510 | 0.80 | 1.67270 | 32.17 | 0.5662 | HOYA E-FD5 |
| 13 | −46.938 | 1.15 | 1.82080 | 42.71 | 0.5642 | HOYA M-TAFD51 |
| 14* | −15.876 | 11.835 | | | | |
| 15 | ∞ | 1.40 | 1.51680 | 64.20 | | FILTER |
| 16 | ∞ | | | | | |

Aspheric Surface Data
Second Surface
  K=2.84801, A4=8.10328×10$^{-8}$, A6=−8.51224×10$^{-7}$, A8=5.97881×10$^{-6}$, A10=−9.76289×10$^{-10}$ 14th Surface
$K=-0.71102$, $A4=2.26643\times10^{-4}$, $A6=2.60218\times10^{-6}$, $A8=6.37436\times10^{-8}$, $A10=-6.07070\times10^{-10}$ Numerical Values of Parameters of Conditional Expressions $f_1/f_4=0.160$ (1)

$f_{1-2}/f_{3-4}=1.107$ (2)

$f_1/f=-1.339$ (3)

$r_{2F}/f=-1.248$ (4)

$r_{3R}/f=0.779$ (5)

$nd_{P2-3}=1.828$ (6)

$Y'/f=0.776$ (7)

$\tan(\theta P_{max})=0.751$ (8)

$L/f=1.763$ (9)

$D_T/f=1.012$ (10)

$r_{2R}/r_{3F}=-2.413$ (11)

$vd_{n1}=70.45$ (12)

Example 8

| | f = 18.30, F = 2.88, ω = 38.2 | | | | | |
|---|---|---|---|---|---|---|
| SURFACE NUMBER | R | D | Nd | vd | Pg, F | GLASS NAME |
| 01 | 50.000 | 0.80 | 1.51633 | 64.06 | 0.5404 | OHARA L-BSL7 |
| 02* | 11.239 | 2.03 | | | | |
| 03 | −17.410 | 0.60 | 1.67270 | 32.17 | 0.5962 | HOYA E-FD5 |
| 04 | ∞ | 0.20 | | | | |
| 05 | 12.482 | 2.30 | 1.77250 | 49.62 | 0.5503 | HOYA TAF1 |
| 06 | −33.848 | 1.51 | | | | |
| 07 | APERTURE | 1.00 | | | | |
| 08 | 13.642 | 2.82 | 1.88300 | 40.80 | 0.5654 | HOYA TAFD30 |
| 09 | −8.732 | 0.60 | 1.69895 | 30.05 | 0.5962 | HOYA E-FD15 |
| 10 | 16.067 | 1.85 | | | | |
| 11 | −8.748 | 0.80 | 1.64769 | 33.84 | 0.5923 | HOYA E-FD2 |
| 12 | −37.243 | 1.20 | 1.82080 | 42.71 | 0.5642 | HOYA M-TAFD51 |
| 13* | −13.097 | 12.720 | | | | |
| 14 | ∞ | 1.40 | 1.51680 | 64.20 | | FILTER |
| 15 | ∞ | | | | | |

Aspheric Surface Data
Second Surface
$K=2.31354$, $A4=4.39060\times10^{-5}$, $A6=-1.54647\times10^{-6}$, $A8=9.94796\times10^{-8}$, $A10=-1.38635\times10^{-9}$ 13th Surface
$K=-2.16285$, $A4=2.75665\times10^{-4}$, $A6=4.58115\times10^{-6}$, $A8=1.02845\times10^{-7}$, $A10=-1.35694\times10^{-9}$ Numerical Values of Parameters of Conditional Expressions $f_1/f_4=0.302$ (1)

$f_{1-2}/f_{3-4}=1.938$ (2)

$f_1/f=-1.545$ (3)

$r_{2F}/f=-0.951$ (4)

$r_{3R}/f=0.878$ (5)

$nd_{P2-3}=1.828$ (6)

$Y'/f=0.776$ (7)

$\tan(\theta P_{max})=0.727$ (8)

$L/f=1.657$ (9)

$D_T/f=0.858$ (10)

$r_{2R}/r_{3F}=-2.481$ (11)

$vd_{n1}=64.06$ (12)

FIGS. 9-16 illustrate aberration diagrams of the imaging lenses in the above Examples 1-8.

Among those aberration diagrams, a broken line in a diagram of spherical aberration denotes a sine condition. A solid line, and a broken line in a diagram of astigmatism denote astigmatism in a sagittal plane, and astigmatism in a meridional plane, respectively.

As is clear from each aberration diagram, in each example, aberration is highly-corrected, and spherical aberration and axial chromatic aberration are extremely small. Astigmatism, field curvature, lateral chromatic aberration are sufficiently small, and comatic aberration and blurring of color difference are favorably suppressed in a most peripheral part.

Distortion is less than or equal to 2.0% in an absolute value.

As is clear from those examples, according to an embodiment of the present invention, it is possible to achieve an imaging lens that is wide-angle and has a large diameter such that a half angle of view is approximately 35-43 degrees and a smallest F-number is approximately F2.8, achieves miniaturization in everything of an entire length, an entire thickness, and a diameter of the lens, and ensures extremely favorable imaging performance.

According to an imaging lens according to an embodiment of the present invention, it is possible to achieve a high-performance imaging lens that is wide-angle and has a large diameter such that a half angle of view is approximately 35-43 degrees and a smallest F-number is approximately F2.8, and is small in everything of an entire length, an entire thickness, and a diameter of the lens, and sufficiently reduces various aberrations, and has resolution corresponding to a 12-24 megapixel image sensor.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging lens, consisting of in order from an object side to an image side,
   a first lens group having a negative refractive power;
   a second lens group having a positive refractive power;
   an aperture;
   a third lens group having a positive refractive power; and
   a fourth lens group,
   wherein a refractive power of the fourth lens group is weakest among all of the lens groups, the first lens group consists of a negative lens a concave surface of which faces the image side, the second lens group consists of in order from the object side to the image side a negative lens a concave surface of which faces the object side, and a positive lens, or a cemented lens entirely having a positive refractive power, the third lens group consists of a cemented lens of a biconvex lens and a biconcave lens from the object side, and the fourth lens group is a single lens, or a cemented lens, a surface on the object side of which is a concave surface and a surface on the image side of which is a convex surface.

2. The imaging lens according to claim 1, wherein a focal length of the first lens group: $f_1$, and a focal length of the fourth lens group: $f_4$ satisfy Conditional Expression:

$$-0.2 < f_1/f_4 < 0.5 \tag{1}.$$

3. The imaging lens according to claim 1, wherein a combined focal length of the first lens group and the second lens group: $f_{1-2}$, and a combined focal length of the third lens group and the fourth lens group: $f_{3-4}$ satisfy Conditional Expression:

$$0.3 < f_{1-2}/f_{3-4} < 2.5 \tag{2}.$$

4. The imaging lens according to claim 1, wherein a focal length of the first lens group: $f_1$, and a focal length of an entire lens system in a state of focusing on an object at infinity: f satisfy Conditional Expression:

$$-2.2 < f_1/f < -0.8 \tag{3}.$$

5. The imaging lens according to claim 1, wherein a focal length of an entire lens system in a state of focusing on an object at infinity: f, and a curvature radius of a surface on a most object side of the second lens group: $r_{2F}$ satisfy Conditional Expression:

$$-1.5 < r_{2F}/f < -0.5 \tag{4}.$$

6. The imaging lens according to claim 1, wherein a focal length of an entire lens system in a state of focusing on an object at infinity: f, and a curvature radius of a surface on a most image side of the third lens group: $r_{3R}$ satisfy Conditional Expression:

$$0.5 < r_{3R}/f < 1.2 \tag{5}.$$

7. The imaging lens according to claim 1, wherein an average refractive index of a material of a positive lens included in the second lens group and the third lens group: $nd_{p2-3}$ satisfies Conditional Expression:

$$1.75 < nd_{p2-3} < 2.0 \tag{6}.$$

8. The imaging lens according to claim 1, wherein a focal length of an entire lens system in a state of focusing on an object at infinity: f, a maximum image height: Y', and an angle of a principal ray incident onto an image plane that reaches the maximum image height: $\theta P_{max}$ satisfy Conditional Expressions:

$$0.7 < Y'/f < 0.95 \tag{7}$$

$$0.6 < \tan(\theta P_{max}) < 0.95 \tag{8}.$$

9. The imaging lens according to claim 1, wherein a distance from a surface on a most object side of the first lens group to an image plane in a state of focusing on an object at infinity: L, and a focal length of an entire lens system in a state of focusing on an object at infinity: f satisfy Conditional Expression:

$$1.4 < L/f < 2.0 \tag{9}.$$

10. The imaging lens according to claim 1, wherein a distance from a surface on a most object side of the first lens group to a surface on a most image side of the fourth lens group: DT, and a focal length of an entire lens system in a state of focusing on an object at infinity: f satisfy Conditional Expression:

$$0.7 < D_T/f < 1.2 \tag{10}.$$

11. A camera comprising: the imaging lens according to claim 1 as a photographing optical system.

12. A portable information terminal device comprising: the imaging lens according to claim 1 as a photographing optical system of a camera function part.

13. An imaging lens, comprising: in order from an object side to an image side,
   a first lens group having a negative refractive power;
   a second lens group having a positive refractive power;
   an aperture;
   a third lens group having a positive refractive power; and
   a fourth lens group,
   wherein a refractive power of the fourth lens group is weakest among all of the lens groups, the first lens group includes a negative lens a concave surface of which faces the image side, the second lens group includes in order from the object side to the image side a negative lens a concave surface of which faces the object side, and a positive lens, or a cemented lens entirely having a positive refractive power, the third lens group includes a cemented lens of a biconvex lens and a biconcave lens from the object side, and the fourth lens group is a single lens, or a cemented lens, a surface on the object side of which is a concave surface and a surface on the image side of which is a convex surface,
   wherein a focal length of the first lens group: $f_1$, and a focal length of the fourth lens group: $f_4$ satisfy Conditional Expression:

$$-0.2 < f_1/f_4 < 0.5 \tag{1}.$$

14. An imaging lens, comprising: in order from an object side to an image side,
   a first lens group having a negative refractive power;
   a second lens group having a positive refractive power;
   an aperture;
   a third lens group having a positive refractive power; and
   a fourth lens group,
   wherein a refractive power of the fourth lens group is weakest among all of the lens groups, the first lens group includes a negative lens a concave surface of which faces the image side, the second lens group includes in order from the object side to the image side a negative lens a concave surface of which faces the object side, and a positive lens, or a cemented lens entirely having a positive refractive power, the third lens group includes a cemented lens of a biconvex lens and a biconcave lens from the object side, and the fourth lens group is a single lens, or a cemented lens, a surface on the object side of which is a concave surface and a surface on the image side of which is a convex surface, wherein a combined focal length of the first lens group and the second lens group: $f_{1-2}$, and a combined focal length of the third lens group and the fourth lens group: $f_{3-4}$ satisfy Conditional Expression:

$$0.3 < f_{1-2}/f_{3-4} < 2.5 \qquad (2).$$

* * * * *